United States Patent
Astakhova et al.

(10) Patent No.: US 10,044,729 B1
(45) Date of Patent: Aug. 7, 2018

(54) ANALYZING REQUESTS TO AN ONLINE SERVICE

(71) Applicant: Microsoft Technology Licensing, LLC, Redmond, WA (US)

(72) Inventors: Yulia Astakhova, Mountain View, CA (US); Lifeng Sang, San Jose, CA (US); Theodore H. Hwa, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 14/956,292

(22) Filed: Dec. 1, 2015

(51) Int. Cl.
*H04L 29/08* (2006.01)
*H04L 29/06* (2006.01)

(52) U.S. Cl.
CPC ........ *H04L 63/105* (2013.01); *H04L 63/0236* (2013.01)

(58) Field of Classification Search
CPC .................. H04L 63/105; H04L 63/0236
See application file for complete search history.

(56) References Cited

U.S. PATENT DOCUMENTS

| | | | | |
|---|---|---|---|---|
| 9,043,942 B1* | 5/2015 | Birdwell Rockson | .. G06F 21/10 | 726/28 |
| 9,071,576 B1* | 6/2015 | Earl | ..... H04L 63/0236 | |
| 9,313,604 B1* | 4/2016 | Holcombe | ........... H04W 4/001 | |
| 2007/0118653 A1* | 5/2007 | Bindal | ........... H04L 47/10 | 709/226 |
| 2007/0186282 A1* | 8/2007 | Jenkins | ............... H04L 63/1416 | 726/22 |
| 2009/0164632 A1* | 6/2009 | Kumar | ............... H04L 67/2819 | 709/225 |
| 2010/0131668 A1* | 5/2010 | Kamath | ................. H04L 47/32 | 709/233 |
| 2010/0211694 A1* | 8/2010 | Razmov | ................. H04L 67/22 | 709/242 |
| 2012/0060062 A1* | 3/2012 | Lin | ..................... H04L 67/1002 | 714/48 |
| 2012/0233656 A1* | 9/2012 | Rieschick | .......... H04L 63/1441 | 726/1 |
| 2013/0212603 A1* | 8/2013 | Cooke | .................... G06F 9/542 | 719/328 |
| 2014/0304797 A1* | 10/2014 | Fu | ...................... H04L 63/0823 | 726/10 |

(Continued)

Primary Examiner — Eleni A Shiferaw
Assistant Examiner — Hee K Song
(74) Attorney, Agent, or Firm — Hickman Palermo Becker Bingham LLP

(57) ABSTRACT

Computerized methods enable automatic monitoring of requests to an online service and apply access restrictions, as appropriate, to servicing of requests in real-time or near real-time. For each request received by the online service, a plurality of parameters associated with the request are identified, and counters corresponding to the particular values of the plurality of parameters associated with the request are incremented to track the number of times a parameter value appears or occurs in connection with requests to the online service. A first level check or analysis is performed to determine whether a second level check or analysis is required. The first level check or analysis comprises an initial screening that is not computationally intensive. The second level check or analysis is more resource-intensive and is triggered depending on the outcome of the first level check or analysis.

18 Claims, 10 Drawing Sheets

(56) References Cited

U.S. PATENT DOCUMENTS

2015/0193600 A1\* 7/2015 Matsuda ............. H04L 63/0823
                                                    726/9
2015/0269377 A1\* 9/2015 Gaddipati ............... G06F 21/44
                                                    726/30

\* cited by examiner

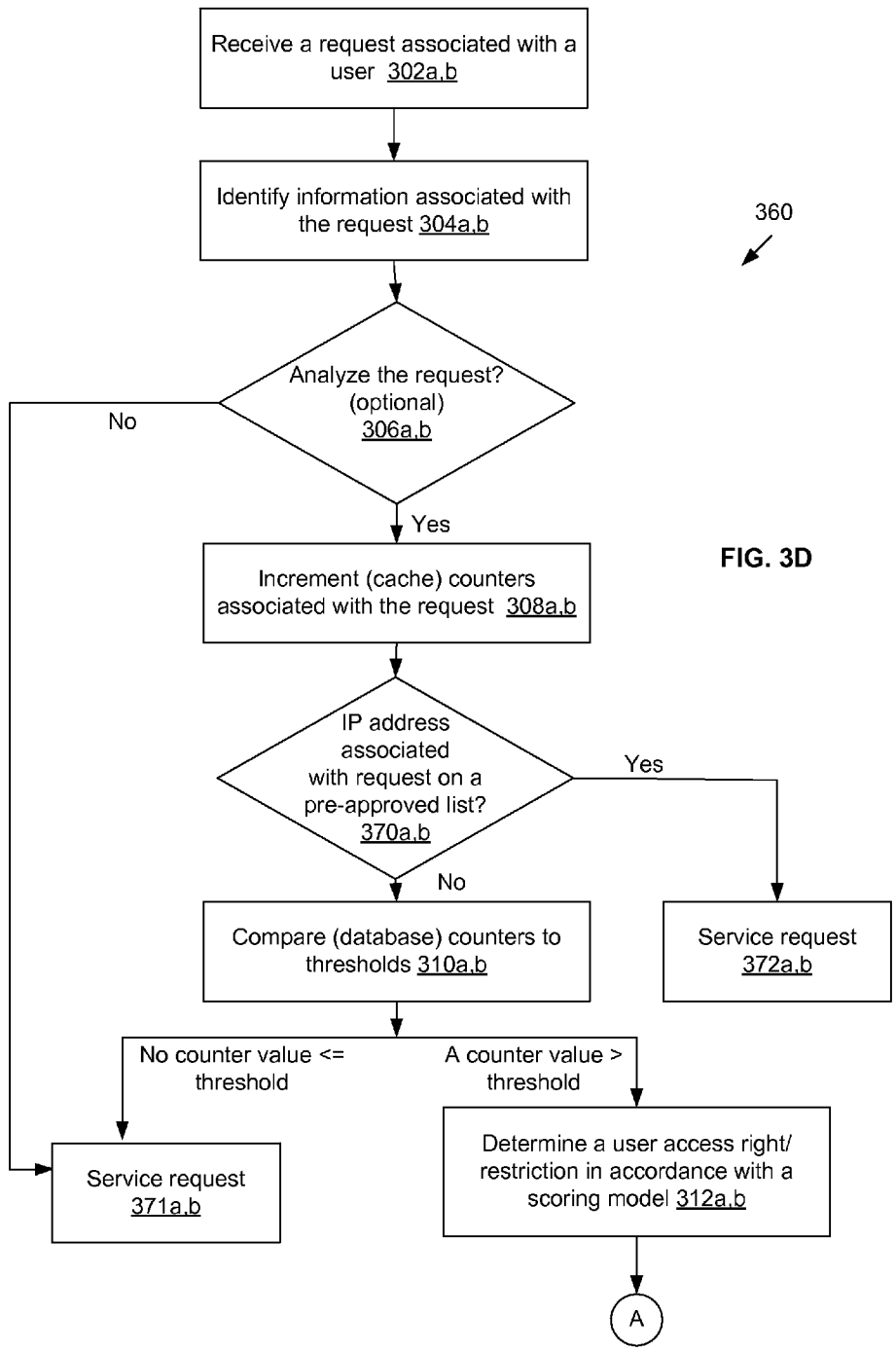

ANALYZING REQUESTS TO AN ONLINE SERVICE

FIELD OF THE DISCLOSURE

The present disclosure relates to online services, and in particular, to maintaining security of online services.

BACKGROUND

Online social networks facilitate sharing of information and interaction among users of the social network. Users typically register with the social network in order for their respective information, interests, preferences, and other associated data to persist over successive sessions. Although the vast majority of users engage in authorized activity on the network, unfortunately there is a subset of users that may engage in unauthorized activity that is adverse to other users and/or the social network at large. Examples of unauthorized activity include spamming one or more other users or scrapping information about one or more other users from the social network platform.

The social network platform may have controls or limits in place to prevent mass misappropriation of information, especially user information. For example, a user may be limited to a certain number of page requests per day. But in response, certain users may simply continue making page requests until he or she is blocked from making further requests, limit the number of requests to just below the request limit, or create multiple accounts on the social network to circumvent the per user limit. At the same time, there are instances when large number page requests are legitimate. Furthermore, when a social network has millions or hundreds of millions of registered users, the amount of activity generated by the registered users on the social network platform at any given time is of such a scale that maintaining a secure network without unduly restricting users or activities is difficult.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 3C-3E depict alternative example flows for automatically assessing requests made by users to the online service in order to apply appropriate access restrictions for respective users, according to some embodiments.

DETAILED DESCRIPTION

Figure 1:
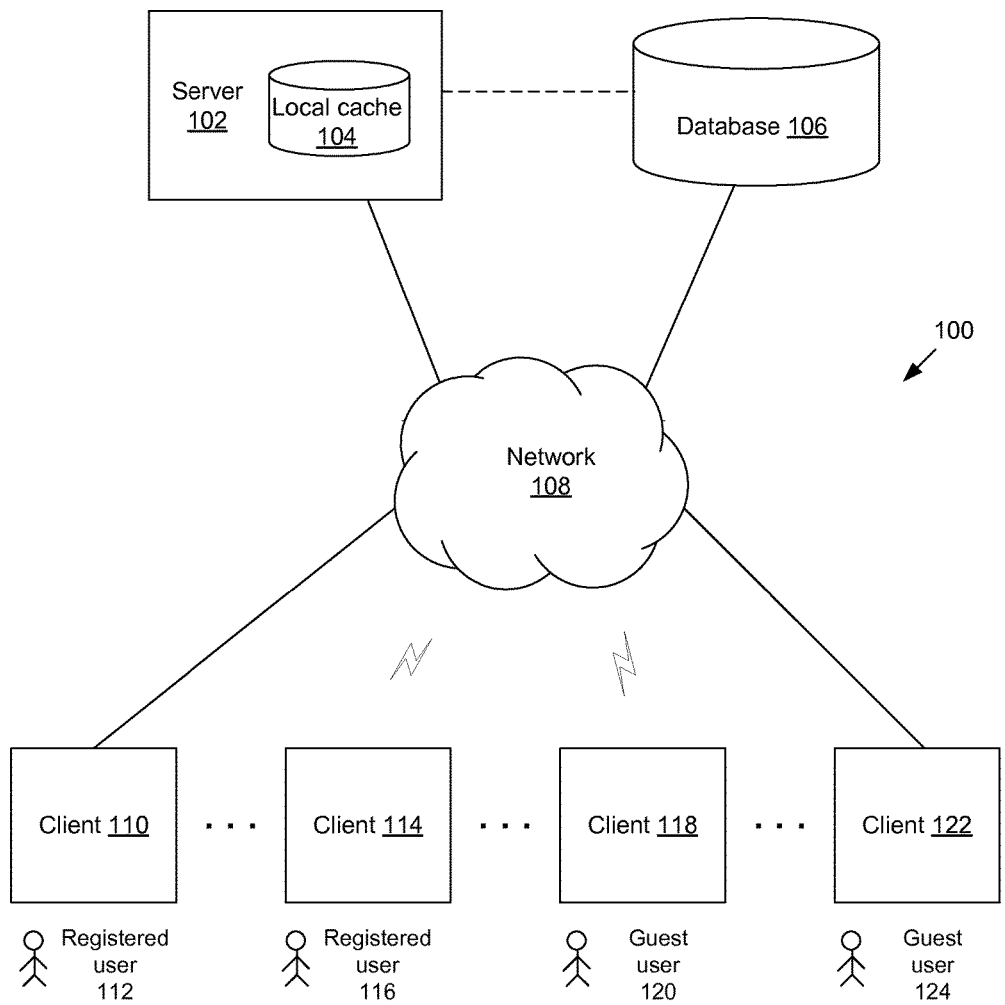
FIG. 1 depicts an example system for automatically analyzing or scoring requests made to an online service, according to some embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present disclosure.

Various modifications to the embodiments will be readily apparent to those skilled in the art, and principles defined herein may be applied to other embodiments and applications without departing from the spirit and scope of the invention. Moreover, in the following description, numerous details are set forth for the purpose of explanation. However, one of ordinary skill in the art will realize that embodiments may be practiced without the use of these specific details. In other instances, well-known structures and processes are not shown in block diagram form in order not to obscure the description of embodiments with unnecessary detail. Thus, the present disclosure is not intended to be limited to the embodiments shown, but is to be accorded the widest scope consistent with the principles and features disclosed herein.

General Overview

In an embodiment, a programmatic method enables automatic monitoring of requests to an online service in order to determine and apply real-time or near real-time access restrictions on a particular user basis to content available on the online service. The requests may be page requests, such as requests for particular user profile pages of an online social network. For each request received by the online service, a plurality of parameters associated with the request are identified and/or collated (e.g., IP address, member identifier, ASN, browser identifier, user agent), and counters corresponding to the particular values of the plurality of parameters associated with the request are incremented to track the number of times a parameter value appears or occurs in connection with requests to the online service. Next, a first level check or analysis is performed to quickly determine whether a second level check or analysis is required. The first level check or analysis comprises an initial screening that is not computationally intensive. The second level check or analysis is more resource-intensive and is triggered depending on the outcome of the first level check or analysis.

In an embodiment, the first level check or analysis comprises comparisons of counters for the same parameter values as those associated with the request against various thresholds. If any such counter is deemed to be merit further analysis, then the second level check or analysis is triggered. In the second level check or analysis, a plurality of attributes is defined to determine a particular user access right restriction to apply to a user associated with the request. Different restrictions may to be applied to different groups of users. Users that are uniquely identifiable by the online service (e.g., users with accounts on the online service and who are signed or logged in at the time that the users make the requests)—referred to a registered users or member users—may be subject to certain restrictions that are different from users not uniquely identifiable by the online service (e.g., users without accounts and/or users who are not signed or logged in)—referred to as guest users.

The programmatic method further enables one or more final checks using the IP address associated with the request to ensure that trusted entities who may make a large number of requests and who would otherwise appear to be making requests for suspicious purposes are not restricted access to the online service. In an embodiment, all requests to the online service may be automatically analyzed as described herein. In order to optimize handling of the large number of requests, one or more optimization techniques may be employed to reduce use of resources. For example, counts maintained in the (initial) counters may be propagated to other sets of counters, which may be used for longer term or permanent storage of count values, in a selective and/or aggregated format rather than on a per request basis.

In this manner, techniques to comprehensively analyze incoming requests and apply appropriate restrictions to respective particular users associated with the requests are disclosed herein. Not only is the analysis tailored to the particular characteristics of each request and/or the user associated with the request, the particular restriction that is triggered by the request is also applicable just to the user associated with the request (or in some embodiments, just the current request) rather than all requests, all users, all requests of the same type, or other broader category. These and other details regarding various request handling techniques are discussed in detail below.

Example Computer System Implementation

FIG. 1 depicts an example computer-based system 100 in which the techniques described may be practiced, according to some embodiments. The various components of system 100 are implemented at least partially by hardware at one or more computing devices, such as one or more hardware processors executing instructions stored in one or more memories for performing various functions described herein. System 100 illustrates only one of many possible arrangements of components configured to perform the functionality described herein. Other arrangements may include fewer or different components, and the division of work between the components may vary depending on the arrangement.

System 100 includes a server 102, a database 106, a network 108, and one or more clients 110, 114, 118, and 122. Each of the server 102, database 106, and clients 110, 114, 118, 122 is in wired or wireless communication with the network 108.

Server 102 comprises one or more servers, computers, processors, webpage servers, database servers, and/or computing devices configured to communicate with the database 106 and/or clients 110, 114, 118, or 122 via network 108. Server 102 hosts one or more applications, websites, social networks, and/or analysis or scoring mechanisms related to techniques and data described in detail below. Server 102 can also include a local cache 104 (also referred to as a storage device or memory) as described in detail below. Server 102 may be located at one or more geographically distributed locations. Although one server 102 is shown in FIG. 1, system 100 may, depending on the embodiment, comprise one, two, or any number of servers 102, which may work alone and/or collectively to provide the functionality described herein. In some embodiments, local cache 104 may be located external to server 102.

Database 106 comprises one or more databases, data stores, or storage devices configured to store and maintain counters, data associated with conducting page request analysis, user profiles, data associated with user profiles, data associated with use of or access to user profiles, data derived from user profiles, and/or instructions for use by server 102 and/or clients 110, 114, 118, or 122 as described herein. Database 106 may, in some embodiments, be located at one or more geographically distributed locations relative to server 102. Server 102 and/or clients 110, 114, 118, or 122 may, in some embodiments, access database 106 via network 108. Alternatively, server 102 may access database 106 without use of network 108. As another alternative, database 106 may be included within server 102. System 100 may, depending on the embodiment, comprise one, two, or any number of databases 106 configured to individually and/or collectively store the data described herein.

Network 108 comprises a communications network, such as a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), a cellular network, or a combination of two or more such networks. When network 108 comprises a public network, security features (e.g., VPN/SSL secure transport) may be included to ensure authorized access within system 100.

Clients 110, 114, 118, and 122 comprise computing devices, including but not limited to, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Each of the clients 110, 114, 118, and 122 includes applications, software, and/or other executable instructions to facilitate various aspects of the techniques described herein. Clients 110, 114, 118, and 122 may also include additional applications or other interface capabilities to communicate with the server 102 and/or database 106. Clients 110, 114, 118, and 122 may, depending on the embodiment, be located geographically dispersed from each other, server 102, and/or database 106.

In an embodiment, clients 110, 114, 118, and 122 may be used by users to access and conduct activity on online social networks, online platforms, websites, mobile apps, or the like (collectively referred to as online services). Users may request a page or particular information from an online service. For instance, a user may request a particular user profile page from an online social network. In FIG. 1, a registered user 112 interfaces with client 110, a registered user 116 interfaces with client 114, a guest user 120 interfaces with client 118, and a guest user 124 interfaces with client 122. Although four clients 110, 114, 118, and 122 are shown in FIG. 1, more or less than four clients 110, 114, 118, and 122 may be included in system 100.

Each of registered users 112, 116 comprises a user or entity that has an account with the online service of interest and is logged into the online service at the time a user request is made. Each of the registered users 112, 116 (also referred to as member users) may be identifiable by a unique member identifier (also referred to as a member ID, MID, or user identifier) on the online service. Each member identifier has associated therewith a user profile or account (and associated activity) corresponding to a registered user. Each of guest users 120, 124 comprises a user or entity not uniquely identifiable by the online service. This may be the case because no account has been created and/or the guest user did not log into the online service. Guest users 120, 124 may also be referred to as non-registered users, non-member users, or the like.

Figure 2:
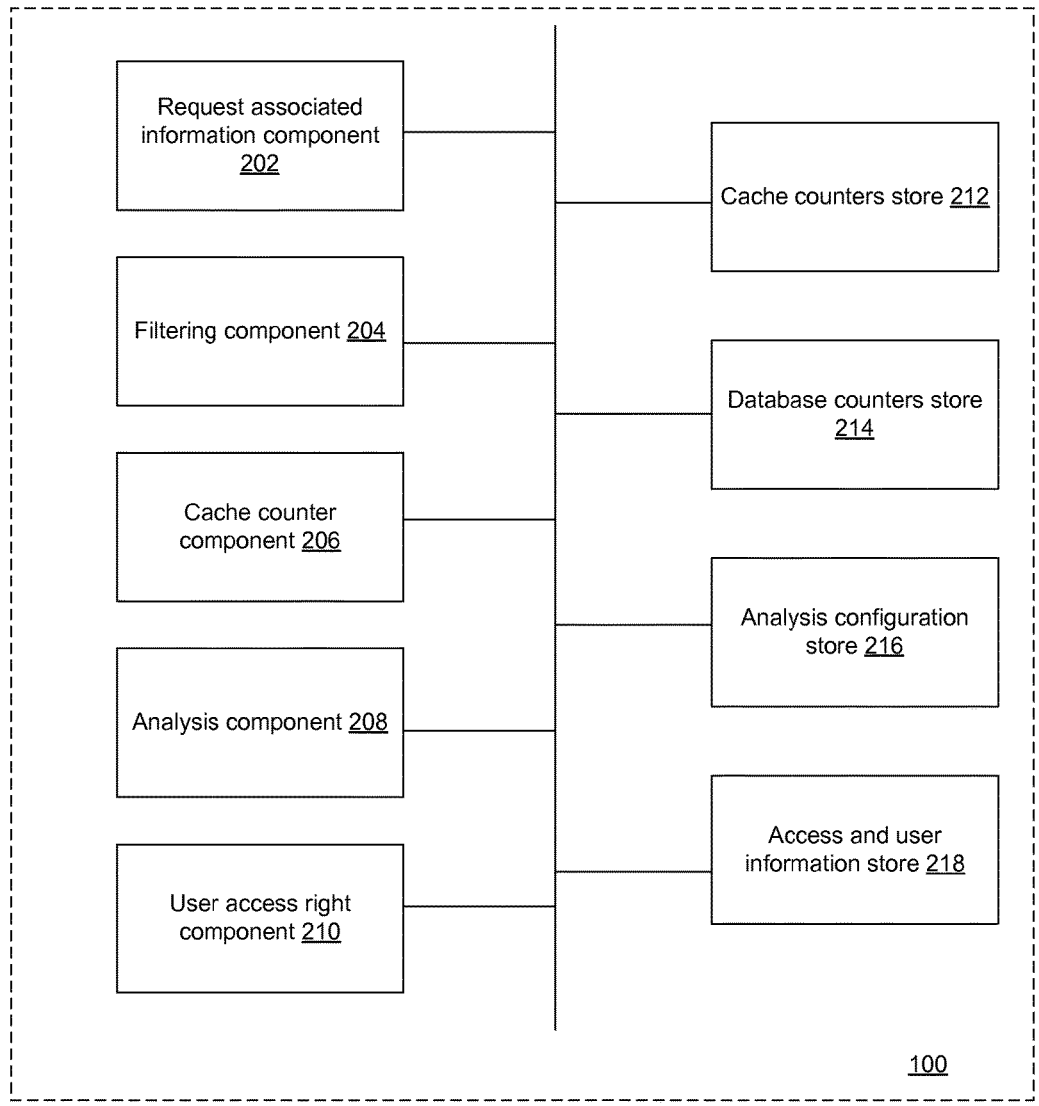
FIG. 2 depicts example components and data included in the system of FIG. 1, according to some embodiments.

FIG. 2 depicts example components and data that may be included in system 100 to automatically analyze and handle requests made to an online service by any user (e.g., registered users and guest users), according to some embodiments. The various components and/or data of system 100 are implemented at least partially by hardware at one or more computing devices, such as one or more hardware processors executing instructions stored in one or more memories for performing various functions described herein. The components and/or data are communicatively coupled (e.g., via appropriate interfaces) to each other and to various data sources, so as to allow information to be passed between the components and/or to share and access common data. FIG. 2 illustrates only one of many possible arrangements of components and data configured to perform the functionality described herein. Other arrangements may include fewer or different components and/or data, and the division of work between the components and/or data may vary depending on the arrangement.

In an embodiment, system 100 includes a request associated information component 202, a filtering component 204, a counter component 206, an analysis component 208, and a user access right component 210. Components 202-210 may be included in the server 102. Alternatively, one or more of components 202-210 may be included in the server 102 or database 106, and others of the components 202-210 may be included in clients 110, 114, 118, 122. For example, request associated information component 202 may be included in clients 110, 114, 118, 122 to obtain, collate, or otherwise perform preliminary operations pertaining to information associated with the request originating at the respective client, while the remaining components reside in the server 102. The request associated information component 202 may comprise a plug-in or other component provided by the online service and downloaded to the clients 110, 114, 118, and/or 122.

In an embodiment, system 100 further includes data such as, but not limited to, a cache counters store 212, a database counters store 214, an analysis configuration store 216, and an activity and user information store 218. As described in detail below, store 212 can be included in local cache 104 and stores 214-218 can be included in the database 106. Alternatively, stores 212, 216 may be included in local cache 104 and/or server 102 and stores 214, 218 may be included in database 106.

As discussed in greater detail below, the request associated information component 202 identifies information associated with a request made by a user to an online service (e.g., a page request made by a registered or guest user). Identified information may include, without limitation, one or more of an Internet Protocol (IP) address, a member identifier associated with a user or entity making the request, an autonomous system number (ASN), a browser identifier associated with the client (e.g., client 110, 114, 118, or 122) from which the request was made, a user agent (UN), page identifier, and the like. In an embodiment, filtering component 204 determines whether the particular page specified in the request is a page that is pre-determined to be excluded from analysis as described herein. For instance, certain pages that are deemed to be of low importance to the online service, such as pages containing little or no user information, may be served in response to the request without impacting user access rights. As such, requests for these pages need not be analyzed. Alternatively, filtering component 204 may be omitted if all requests, regardless of the particular pages requested, are analyzed as described herein.

Counter component 206 increments cache counters in the cache counter store 212 associated with the particular values of a plurality of parameters associated with the request. The plurality of parameters may be all or a portion of the identified information associated with the request. In an embodiment, the plurality of parameters comprises: IP address, member identifier, ASN, browser identifier, and user agent. A particular value of each of these parameters has a unique cache counter associated therewith. For example, the IP address parameter may have a value of 123.456.77.7; 123.456.88.8; 123.456.99.9; or other unique IP address value. A first cache counter exists for the IP address value 123.456.77.7; a second cache counter exists for the IP address value 123.456.88.8; a third cache counter exists for the IP address value 123.456.99.9; and the like. Depending on the user making the request and/or the particular configuration of the client from which the request is made, one or more parameters may be unavailable for the request, and thus, fewer than five cache counters associated with the request may be incremented. For example, for a guest user request, a member identifier may not be available and no cache counter for a member identifier value may be incremented.

Figure 3A:
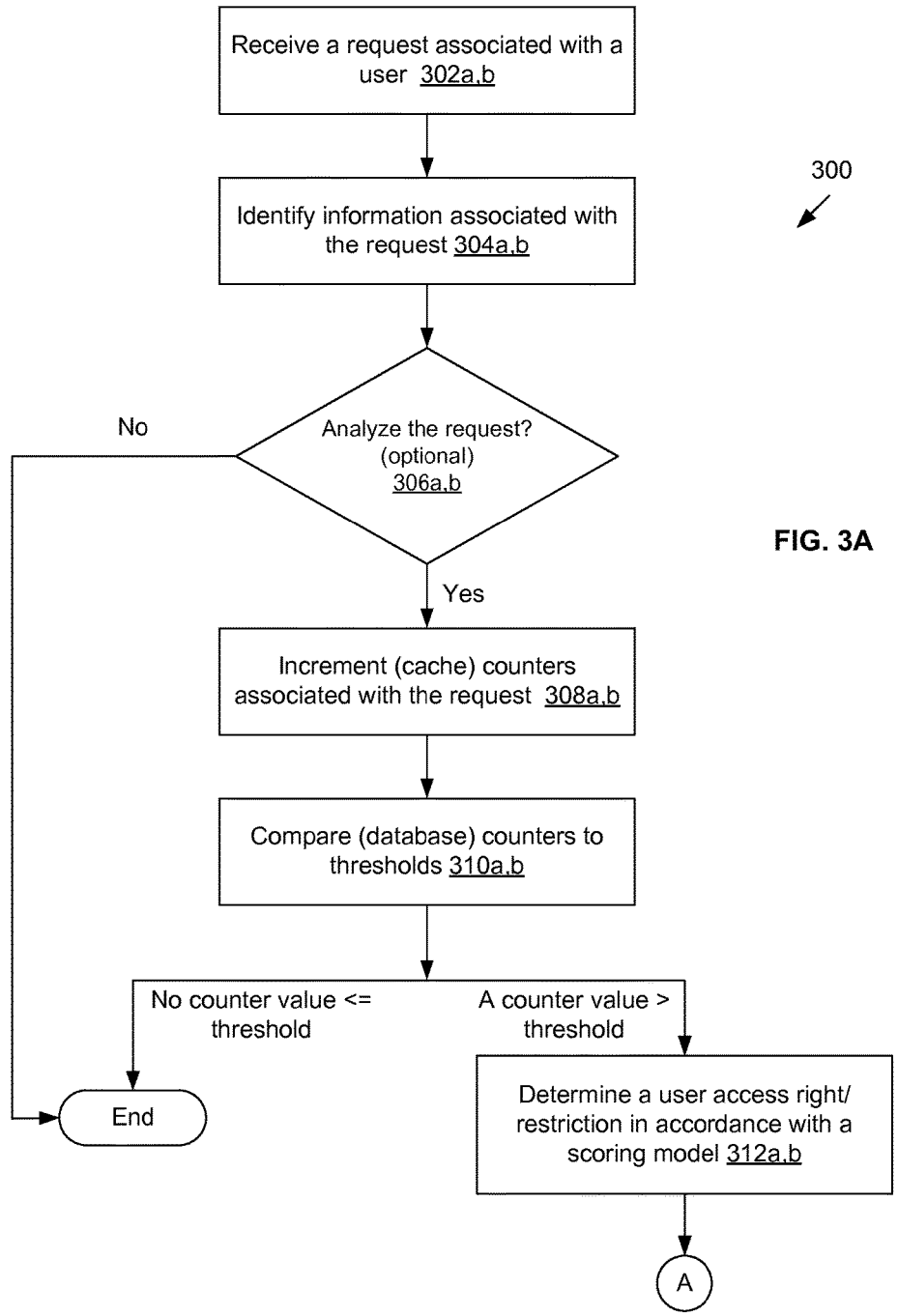
FIGS. 3A-3B depict an example flow for automatically assessing requests made by users to the online service in order to apply appropriate access restrictions for respective users, according to some embodiments.
Figure 3B:
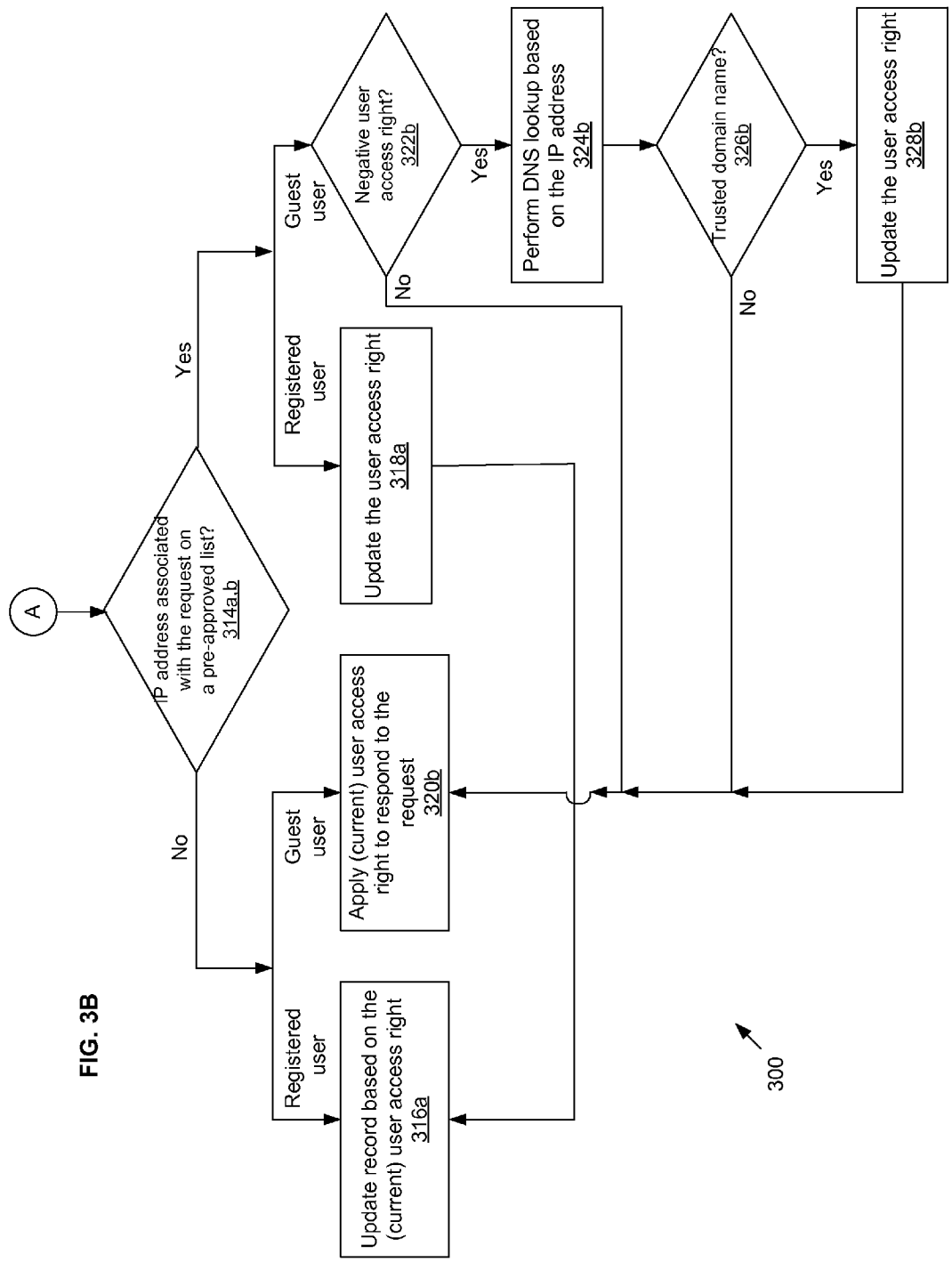
Figure 3C:
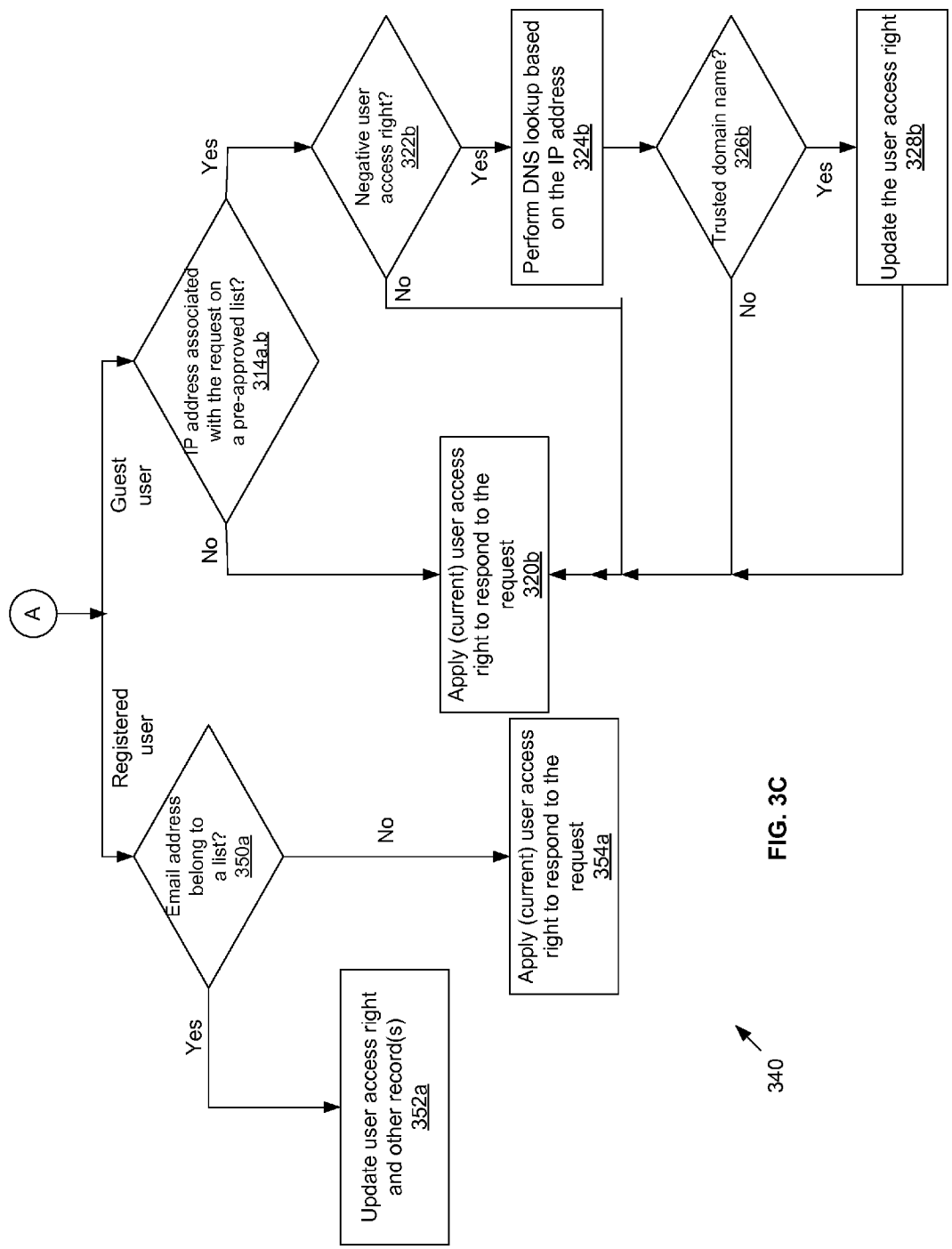

The analysis component 208 performs a first level check or analysis. Analysis component 208 compares values of counters associated with the request against respective thresholds. In an embodiment, the counters are those included in the database counters store 214 and the thresholds are specified in the analysis configuration store 216. Details of the first level check or analysis are described below in connection with FIG. 3A.

If the value of a counter exceeds its respective threshold, analysis component 208 performs a second level check or analysis of information associated with the request and information associated with the user to determine whether and/or what to restrict of the user's access rights to the online service. Information associated with the request (IP address reputation, user agent reputation, browser identifier reputation, etc.) and information associated with the user (user profile information, user activity information, history of analyses performed on previous user requests, etc.) may be obtained from the access and user information store 218. The user access right component 210 in conjunction with the analysis component 208 applies the user access right that has been determined to the particular user that initiated the request. The determined user access right may be specific to the type of user that initiated the request, namely, a registered user or a guest user.

In an embodiment, if the IP address associated with the request is on a pre-approved list (a white list), then the analysis component 208 performs additional checks to ensure that the request is for a legitimate purpose and the user making the request is not restricted.

In some embodiments, counter component 206 aggregates incrementing values of respective cache counters (in the cache counters store 212) occurring within a certain time period before updating or transferring the cache counter values to database counters (in the database counters store 214) for longer term storage and use in performing the first level check or analysis. This is in contrast to incrementing cache counters in response to a single request and then updating/transferring such data to the database counters on a per request basis. The aggregation technique discussed in detail below reduces the number of data transfers and associated use of resources in an already data-transfer intensive system.

In one embodiment, components 202-210 comprise one or more software components, programs, applications, or other units of code base or instructions configured to be executed by one or more processors included in the server 102 and/or database 106. Although components 202-210 are depicted as distinct components in FIG. 2, components 202-210 may be implemented as fewer or more components than illustrated. Data stores 212-218 may be implemented as fewer or more data stores than illustrated. Data stores 212-218 may be organized in particular data structures, data tables, data spreadsheets, relational data scheme, and the like. Any of components 202-210 or data stores 212-218 may communicate with one or more devices included in the system 100, such as server 102, local cache 104, database 106, or clients 110, 114, 118, 122.

Example Functional Implementation

FIGS. 3A-3E depict example flows for automatically assessing requests initiated by users to the online service in order to apply appropriate access restrictions for respective users, according to some embodiments. FIGS. 3A-3E are described in detail below in conjunction with the components and data of FIG. 2. In an embodiment, each of the processes described in connection with the functional blocks of FIGS. 3A-3E may be implemented using one or more computer programs, other software elements, and/or digital logic in any of a general-purpose computer or a special-purpose computer, while performing data retrieval, transformation and storage operations that involve interacting with and transforming the physical state of memory of the computer. Flow 300 depicts example techniques performed in response to a request made by a particular user to the online service. The process of flow 300 can be repeated for each request made by a user (or entity) to the online service. In an embodiment, requests to the online service can be requests for particular pages created, maintained, and/or provided by an online social network, such as user profile pages and entity profile pages.

Flow 300 is described below first with respect to a request made by a registered user, in which the corresponding blocks are labeled with reference numbers ending in "a," such as 302a or 316a. Second, flow 300 is described with respect to a request made by a guest user, with the corresponding blocks labeled with reference numbers ending in "b," such as 302b or 320b.

Registered User Request

In block 302a, the request associated information component 202 receives a request from a registered user to the online service (via client 110 or 114), such as a request for a particular page on an online social network platform. The request may also be referred to as a user request or a page request. In an embodiment, a load balancer may be the first point of contact with the request within the online social network platform. The load balancer generates a message or other data in response to receipt of the request, which is provided to a transport mechanism within the server 102. The server 102 then consumers, listens, processes, and/or otherwise generates an event associated with the request. In other embodiments, more or fewer components may be included in the online social network platform to receive and/or process the request. For example, server 102 may be the first point of contact for the incoming request on the online social network platform and process the request as discussed below.

The request associated information component 202 identifies and/or collates information associated with the received request in block 304a. In an embodiment, the identified information includes, without limitation, values of the following parameters: IP address, member identifier, ASN, browser identifier, user agent, page identifier, and possible other information associated with the request. Member identifier comprises a unique identifier of the user or user account making the request. A browser identifier (also referred to as a web browser identifier) comprises a unique identifier known by the online service and may be used as a proxy indicator of a unique device on which the request is made. For example, a browser identifier may be a cookie stored at a particular device (e.g., client 110 or 114) from the online service, or an identifier of a particular web browser running on a particular device from which the particular user account was accessed. Each time a user account is accessed from the particular device, the browser identifier information may be provided to the online service. If another user account is also accessed from the same particular device (e.g., members of the same family may share a common computer), the same browser identifier information is also provided to the online service. If the browser identifier is removed from the particular device, then the next time the particular user account is accessed on the particular device, a different browser identifier is associated with the later access.

In an embodiment, the server 102 checks and gathers user activity information, such as the user log in activity and other information associated with the event as described above.

Next in block 306a, the filtering component 204 determines whether request analysis or scoring techniques should be applied to the received request. In an embodiment, filtering component 204 filters out certain requests in accordance with tables or rules in the analysis configuration store 216. As an example, certain requests may be deemed to be low priority and scoring unnecessary in order to, for example, conserve computing resources. A page request for the home page of the online service is unlikely to be part of a scrapping campaign. And even if it is a scrapping attempt, the home page is unlikely to contain any valuable information, such as user profile information. If the received request is deemed not to be applicable for analysis or scoring (no branch of block 306a), then flow 300 proceeds to end. If the received request is deemed applicable to be analyzed or scored (yes branch of block 306a), then flow proceeds to block 308a. In alternative embodiments, block 306a can be optional and all received requests are analyzed or scored as described herein.

In block 308a, counter component 206 increments counters associated with each value of a plurality of parameters identified in block 304a. In an embodiment, the counters comprise cache counters stored in the cache counters store 212. There are at least two sets of cache counters: a first set of cache counters associated with all or total pages of the online service and a second set of cache counters associated with value or valuable pages of the online service. The second set of cache counters comprises a subset of the first set of cache counters. Cache counters associated with all or total pages are incremented each time in block 308a. Cache counters associated with value or valuable pages are incremented only when the page requested is deemed to be a value or valuable page. Examples of a value or valuable page include, without limitation, a user profile page, an entity (e.g., companies, schools, non-profits, etc.) profile page, or other pages containing information that third parties may value.

In an embodiment, the plurality of parameters comprises five parameters: IP address, member identifier, ASN, browser identifier, and user agent. For a given set of cache counters, each parameter of the plurality of parameters is associated with a plurality of cache counters, one cache counter for each different value of the particular parameter. Thus, at least five particular cache counters associated with all or total pages are incremented—a particular cache counter associated with a particular value of the respective plurality of parameters. In the case that the page requested is also a value or valuable page, five particular cache counters associated with value or valuable pages are also incremented—a particular cache counter associated with a particular value of the respective plurality of parameters. The increment of or updates to particular cache counters are stored in the cache counters store 212.

In some embodiments, the second set of cache counters corresponding to value or valuable pages may be further segmented by more than one type of value or valuable pages. For example, a set of cache counters may be associated with value or valuable pages of the user profile type, a set of cache counters may be associated with value or valuable pages of the entity profile type, and the like. Then the second set of cache counters that is incremented for a page that is of value is the particular cache counters corresponding to the matching page type.

Next in block 310a, the analysis component 208 performs a first level check or analysis of particular counters in accordance with thresholds specified in the analysis configuration store 216. In an embodiment, the particular counters that are analyzed comprise database counters for the parameter values associated with the received request. Database counters are maintained in the database counters store 214. Database counters comprise a set of counters associated with parameter values covering a different time period of request activity than the cache counters and which take into account all of the sets of cache counters associated with parameter values for the online service. The time periods associated with the database counters can be longer time periods than those associated with the cache counters. For example, cache counters may count activity for a duration of one minute and then reset after their respective values have been transferred to the corresponding database counters. While database counters maintain activity counts on a rolling five minute basis, with longer term activity counts, in turn, stored from the five minute database counters to one hour database counters, 24 hour database counters, and the like. In other embodiments, different time periods than discussed above may be set for the various counters depending upon factors such as, without limitation, the number of requests to be analyzed, processing capacity, empirically observed time period(s) that will facilitate timely detection of and response to suspicious requests, request traffic variance at different times of a day, week, month, etc., and the like.

Moreover, while cache counters track "local" information, database counters track aggregated "global" information. For example, assume member and guest requests are serviced by five servers or machines in the online service. Each of the five servers/machines is considered to be a "local" location. Each of the five servers/machines is associated with its own set of cache counters. The database counters maintain an overall or aggregated count across all of these "local" sets of cache counters, thereby tracking the overall count of respective parameter values across all request traffic to the online service. Continuing the example, if there are ten cache counters for a given "local" location— five counters for the five parameters of important pages and five counters for the five parameters of all pages, then there may be twenty database counters—five 5-minute counters for the five parameters of important pages, five 5-minute counters for the five parameters of all pages, five 1-hour counters for the five parameters of important pages, and five 1-hour counters for the five parameters of all pages. In another example, for a given "local" location, there may not be separate cache counters for important pages vs. all pages. Instead, the data may be separated into separate counters only in the database counters. Cache counters may be referred to as temporary, local, or short term counters, and database counters may be referred to as aggregate, total, or long term counters. Additional details about the cache counters and database counters are provided in connection with FIGS. 4A-4B.

In an embodiment, analysis component 208 performs the first level check or analysis using the database counters (e.g., five minute database counters) for the parameter values associated with the received request. For the IP address parameter, if the IP address value associated with the received request is "123.456.78.9," for example, then two database counters are used: an all or total pages database counter for the "123.456.78.9" IP address parameter value, and a value or valuable pages database counter for the "123.456.78.9" IP address parameter value. Likewise, two database counters—one for all or total pages and another for value or valuable pages—for each of the remaining four parameter values are accessed for analysis. Thus, values contained in a total of ten particular database counters are used for comparisons against various threshold values. Note that even if the received request itself is not considered to be a value page, and value or valuable page cache counters are correspondingly not incremented in block 308a, database counters associated with value or valuable pages are involved in this initial check or analysis (also referred to as the first level check or analysis).

In an embodiment, at least three comparisons are performed for each of the plurality of parameters associated with the received request. For each parameter of the plurality of parameters, the following comparisons are performed to determine whether:

$abs > T,$ $value > T1,$ or $(value/abs) > T2,$ where:
abs=the value (or count) contained in the total or all pages (also referred to as absolute) database counter for a particular parameter value,
value=the value (or count) contained in the value or valuable pages database counter for the particular parameter value,
T=a threshold value,
T1=a threshold value, and
T2=a threshold value.

Thresholds T, T1, and T2 may be the same or different from each other. Thresholds T, T1, and T2 may be pre-set values, which may be changed over time as request traffic, security requirements, and/or other factors change. Thresholds T, T1, and T2 are stored in the analysis configuration store 216.

Since the above set of three comparisons are performed for each parameter, when the plurality of parameters comprises five parameters (IP address, member identifier, ASN, browser identifier, and user agent), a total of fifteen comparisons may be performed in block 310a. The thresholds T, T1, and/or T2 associated with one parameter of the plurality of parameters can be the same or different from thresholds T, T1, and/or T2 associated with another parameter of the plurality of parameters.

If none of the thresholds in any of the respective comparisons (e.g., fifteen comparisons) is exceeded, then the received request is deemed to be safe and flow 300 ends. Otherwise, if at least one of the thresholds in the respective fifteen comparisons is exceeded, then the received request is deemed to be suspicious and merit further analysis—the second level check or analysis—in block 312a. The first level check or analysis, also referred to as applying triage rules or a fast analysis, provides a rapid check of attributes of the received request without committing use of more intensive resources for every request.

In block 312a, the analysis component 208 determines the access right of the registered user associated with the request in accordance with restriction rules, models, or attributes, according to some embodiments. Access right associated with the registered user comprises defining a particular restriction to apply to the registered user's account based on the received request, and by extension the registered user, that has been determined to be suspicious or inappropriate in block 310a. The restriction rules, models, or attributes (collectively referred to as a scoring model) may be stored in the analysis configuration store 216. In an embodiment, the scoring model may be specified in text format via a browser, and may be distinct from code base implemented in production systems. Because the scoring model is not part of the code base, they can be adjusted at-will and rapidly deployed in production systems. Rather than taking upwards of a couple of days for deployment if implemented within the code base, the scoring model can be deployed in a matter of minutes.

The scoring model defines a plurality of attributes associated with the registered user and received request to be analyzed and the particular access restriction to apply to the registered user's account based on the analysis. Example attributes that are analyzed include, but are not limited to, one or more of the following:

Age of the registered user's account (e.g., account was opened five years ago)

Number of connections associated with the registered user's account (e.g., first degree connections)

Page requested (e.g., requests for less or non-valuable pages may merit an account restriction that is less restrictive than requests for valuable pages)

Whether a premium (or paying) account vs. free (or non-paying) account is associated with the registered user Reputations or statistics about the IP address, browser identifier, and/or user agent values associated with the received request History of previous times that requests made by the registered user were analyzed or scored Other information associated with the registered user's account (e.g., user profile information)

Other activity associated with the registered user's account (e.g., user activity on the online service)

Other statistics associated with the parameters of the received request

Other statistics associated with previous requests associated with the registered user.

Information about the registered user and the received request may be collated and stored in the analysis configuration store 216 (e.g., on a rolling basis) and/or one or more data lookups may be performed on data stores that are maintained for normal course of business (e.g., user profile data store maintained for accessing the online service such the access and user information store 218).

The result of the analysis is selection of at least one of the following restriction to apply to the registered user's account:

Login restriction,

Logout restriction for current session (e.g., member user will be logged out from the device from which the request is made, but remains logged into his/her other devices), Logout restriction for all sessions (e.g., member user will be logged out from the online service on all his/her devices), Challenge-on login restriction (e.g., including a captcha with login), Notification (e.g., a message tailored to the member user's particular suspicious behavior such as a warning not to repeat in the future and a suggestion to contact customer service if the message is in error), or Other restriction(s) for the registered user regarding access to the online service.

In an embodiment, prior to applying the newly determined restriction to the registered user's account, the analysis component 208 performs a final check to ensure that access to the online service is not interrupted even though the received request appears to be suspicious or inappropriate and a restriction should be applied. In block 314a, analysis component 208 determines whether the IP address associated with the received request is on a pre-approved list (e.g., a white list). The pre-approved list may be maintained in the analysis configuration store 216. The pre-approved list may be a list of IP addresses associated with third parties that paid the online service to ensure access to the online service and/or IP addresses belonging to trusted entities, such as web crawlers used by known search engines.

If the IP address associated with the received request is not on the pre-approved list (no branch of block 314a), then the user access right component 210 in conjunction with the analysis component 208 updates records in block 316a in accordance with the restriction determined in block 312a. The restriction can be stored in the access and user information store 218, and is associated with the registered user's account and/or registered user's access profile information. In some embodiments, the restriction is applied to subsequent requests and/or subsequent access to the online service initiated by the registered user.

If the IP address associated with the received request is on the pre-approved list (yes branch of block 314a), then in block 318a, the analysis component 208 overrides the restriction determined in block 312a so that the restriction will not be applied, in some embodiments, to subsequent requests and/or access to the online service made by the registered user.

In some embodiments, blocks 302a-318a are performed asynchronously from servicing of the received request. The request analysis/scoring is performed as a separate process from responding to the received request (e.g., providing the page requested in the received request). The received request may be serviced regardless of the outcome of the corresponding request analysis/scoring. This may be the case to prevent unnecessary latency in servicing the request, which otherwise requires waiting for the outcome of the request analysis/scoring in order to appropriately respond to the user regarding the request. Additional details regarding when the restriction determined in response to the received request may be applied to future requests are described in connection with FIGS. 4A-4B. In alternative embodiments, blocks 302a-318a may be performed synchronously with servicing of the received request, such that the received request is serviced in accordance with the outcome of the request analysis/scoring.

In an alternative embodiment, blocks 314a, 316a, and 318a may be omitted for registered users, and after a restriction is determined in block 312a for the received request, a check is performed to see whether the email address associated with the registered user is included in an email address white list or equivalent (such as a list of internal accounts). As shown in flow 340 of FIG. 3C, which is an alternative to FIG. 3B, if the email address is included in such a white list or equivalent (yes branch of block 350a), then the restriction determined in block 312a is removed in block 352a. One or more records, such as an external cache or white list, may also be updated in block 352a so that for future requests from this registered user, resources need not be wasted for scoring purposes.

If the email address does not belong to a list (no branch of block 350a), then the restriction determined in block 312a remains and is applied in block 354a.

Guest User Request

For the most part, a request associated with a guest user is analyzed similar to a request associated with a registered user. However, because there is less information in a guest user request in comparison to a registered user request, such as the absence of a unique member identifier information in guest user requests, the analysis technique for guest user requests may comprise analyzing a smaller set of information than for registered user requests.

In block 302b, the request associated information component 202 receives a request from a guest user to the online service (via client 118 or 122), such as a request for a particular page on the online social network platform. Block 302b is similar to block 302a except that the user associated with the request is a guest user rather than a registered user. The user making the request may be classified as a guest user by default because no account on the online service is identifiable for the request. The user may actually have an account but did not log in, the user has an account but failed to log in successfully, the user does not have an account, or other issue occurred such that the user making the request is not uniquely identifiable by the online service.

In some embodiments, pages that may be requested by registered users may be more expansive and/or differ than pages that may be requested by guest users. For example, if a guest user requests a particular user profile page, the page returned to the guest user may be an abbreviated version of the full user profile. In contrast, if a registered user requests the same particular user profile page, the page returned may be the full version of the user profile.

Once the request is received, the request associated information component 202 identifies and collates information associated with the received request in block 304b. Block 304b is similar to block 304a except that the obtained information may be fewer than information obtained in block 304a for a request associated with a registered user. In an embodiment, information associated with the received request made by a guest user may include, without limitation, values of each of the following four parameters: IP address, ASN, browser identifier, and user agent. The member identifier parameter, included in the registered user case, is unavailable because the guest user does not have an account with the online service and/or is unable to be associated with an account on the online service.

Next in block 306b, a filtering operation is performed to determine whether or not to analyze the request, similar to that described for block 306a. As with block 306a, block 306b is also optional in some embodiments. If the received request need not be analyzed (no branch of block 306b), then flow 300 ends. Otherwise the received request is determined to be appropriate for analysis (yes branch of block 306b), and in block 308b, counter component 206 increments counters associated with the received request. In an embodiment, the counters that are incremented comprise cache counters as described above in connection with block 308a, except that cache counters (both the all or total pages cache counter and the value or valuable pages cache counter) corresponding to a member identifier parameter are not involved since no unique member identifier exists for a guest user. Hence, a total of eight cache counters may be incremented for the received request—four of the all or total pages cache counters, one for each of the four parameter values, and four of the value or valuable pages cache counter, one for each of the four parameter values.

In block 310b, the analysis component 208 performs the first level check or analysis as in block 310a, except that no comparisons are performed of database counter values against respective thresholds for at least a member identifier parameter. In an embodiment, if fifteen comparisons are performed in block 310a for the registered user case—three comparisons for each of the five parameters (IP address, member identifier, ASN, browser identifier, and user agent), then twelve comparisons are performed in block 310b for the guest user case—three comparisons for each of the four parameters (IP address, ASN, browser identifier, and user agent). In some embodiments, one or more of the thresholds T, T1, or T2 for any of the parameters associated with the guest user request may be the same or different from corresponding thresholds associated with the registered user request. For example, a threshold for a value or valuable page database counter associated with guest users may be set at a lower value than for registered users to limit requests for valuable pages from unidentifiable persons or entities.

As with the registered user request case, if none of the database counter values exceeds their respective thresholds (no branch of block 310b), then flow 300 ends. The received request is deemed to be legitimate. If at least one of the database counter values exceeds its respective threshold (yes branch of block 310b), then flow 300 proceeds to block 312b.

In block 312b, analysis component 208 performs the second level check or analysis similar to that described for block 312a. However, the scoring model associated with the guest user requests may comprise a subset of the attributes specified for registered user requests. For example, attributes that are analyzed may include, without limitation, one or more of the following:

Page requested (e.g., requests for less or non-valuable pages may merit a restriction that is less restrictive than requests for valuable pages).

Reputations or statistics about the IP address, browser identifier, and/or user agent values associated with the received request.

History of scorings for all parameters (e.g., IP address, user agent, cookie, ASN, etc.). For example, information about how many requests from a particular IP address was blocked during the last hour. Or, Any other information available regarding the received request and/or guest user.

The result of the analysis is selection of one of the following restrictions to be applied in responding to the received request:

No restriction: Accept the request (e.g., service the request with no restriction), Reject restriction: Reject the request (e.g., request is not serviced and instead, an error message page is returned), Redirect restriction: Redirect to a particular page (e.g., request is not serviced and instead, redirected to a login page to obtain additional information), or Other restriction and/or request for additional information to fully service the request.

In an embodiment, because a guest user, even the same guest user, cannot be uniquely identified the next time he or she makes a request to the online service, the result of the request analysis/scoring is applied to the current request. The request analysis/scoring with respect to guest user requests are synchronously performed. In contrast, for registered user requests, the result of the request analysis/scoring can be associated with a registered user's account to be applied to future requests made by the same registered user.

In alternative embodiments, an attempt may be made to approximately identify a guest user from one request to another request. For example, a result of the scoring for a particular combination of IP address, browser identifier, and user agent may be cached for a limited time period (e.g., 10 or 15 minutes). Then the next time a request is received with the same particular combination of parameters within the limited time period, this subsequent request may be deemed to be from the same guest user. And the previously applied restriction may be applied for the subsequent request without the need to perform the first and second level check/analysis.

Next in block 314b, the analysis component 208 performs a final check before servicing the received request. Block 314b is similar to block 314a. If the IP address associated with the received request is not on the pre-approved list (no branch of block 314b), then flow 300 proceeds to block 320b. In block 320b, the user access right component 210 communicates the restriction selected in block 312b to the portion of the online service platform responsible for servicing the received request. Alternatively, the user access right component 210 may control or direct how the received request should be serviced in accordance with the restriction. In any case, the particular restriction is applied to respond to the received request (e.g., accept, reject, redirect, etc.).

If the IP address associated with the received request is on the pre-approved list (yes branch of block 314b), then in block 322b, the user access right component 210 determines whether the restriction or user access right is negative, such as a reject or redirect restriction. If the restriction is positive (e.g., accept the request)(no branch of block 322b), then flow 300 proceeds to block 320b to service the received request. If the restriction is negative (yes branch of block 322b), then a Domain Name Service (DNS) lookup for the IP address is performed in block 324b. This step comprises an additional check to confirm that a legitimate request will not be blocked.

If the domain name corresponding to the IP address is a trusted name, on a pre-approved list, or otherwise deemed to be "safe" (yes branch of block 326b), then the user access right component 210 changes or updates the current restriction, which is a negative restriction, to a positive restriction (e.g., accept the request) in block 328b. Flow 300 then proceeds to block 320b to apply the new current restriction to service the received request. Examples of trusted domain names include search engines such as google.com, yahoo.com, bing.com, and the like.

If the domain name is not trusted (no branch of block 326b), then the current negative restriction is maintained and flow 300 proceeds to block 320b.

Alternative Analysis of Registered and Guest User Requests

Figure 3E:
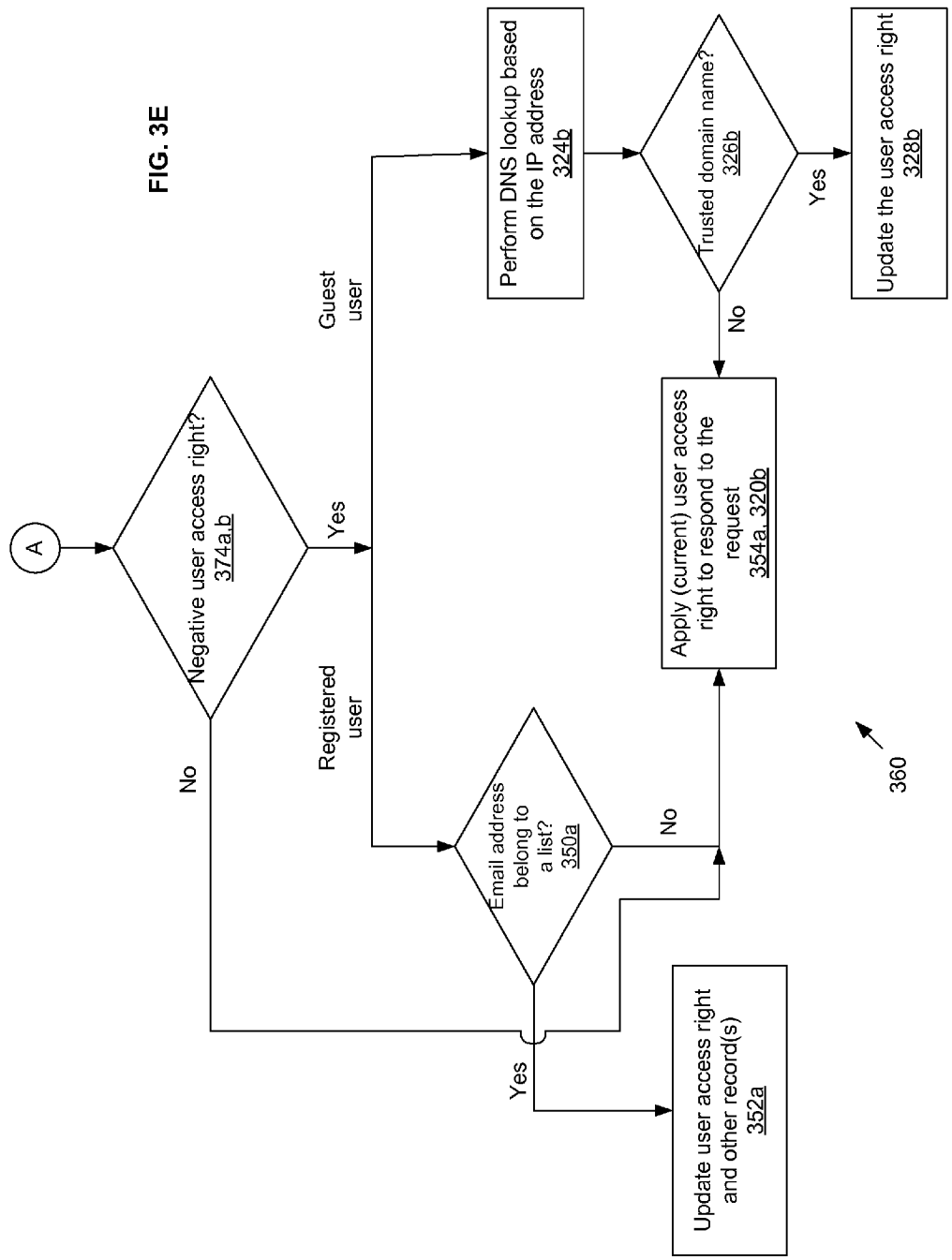

FIGS. 3D-3E depict an example flow 360 that is an alternative to flow 300. Blocks in flow 360 having the same reference numbers as in flow 300 are the same or substantially the same as the respective blocks in flow 300. As in flow 300, reference numbers ending in "a" correspond to registered users and those ending in "b" correspond to guest users.

In block 370a,b of flow 360, prior to comparing database counters to thresholds in block 310a,b, the analysis component 208 performs a check to determine whether the IP address associated with the received request is on a pre-approved list (e.g., a white list) for both registered and guest users. The pre-approved list may be maintained in the analysis configuration store 216. The pre-approved list may be a list of IP addresses associated with third parties that paid the online service to ensure access to the online service and/or IP addresses belonging to trusted entities, such as web crawlers used by known search engines.

If the IP address associated with the received request is not on the pre-approved list (no branch of block 370a,b), then flow 360 proceeds to block 310a,b for both registered and guest users. If the IP address associated with the received request is on the pre-approved list (yes branch of block 370a,b), then the received request is serviced in block 372a,b for both registered and guest users. Further analysis or scoring is not necessary if on the pre-approved list.

If the IP address associated with the received request is not on the pre-approved list (no branch of block 370a,b), then flow 360 proceeds to block 310a,b for both registered and guest users. In block 310a,b, comparisons are performed to determine whether the database counters exceed threshold(s). If none of the database counter values exceed the threshold(s), then the request is serviced in block 371a,b. Block 371a,b is also evoked from the no branch of block 306a,b.

Otherwise, at least one database counter value exceeds a threshold and flow 360 proceeds to block 312a,b. Once the user access right has been determined in block 312a,b for registered and guest users, if the user access right is positive (e.g., no restriction needs to be applied to respond to the received request) (no branch of block 374a,b), then the user access right determined in block 312a,b is applied to respond to the request in block 354a, 320b for registered and guest users. For example, the received request may be serviced.

Otherwise, the user access right is negative (e.g., some restriction is applicable in responding to the received request) (yes branch of block 374a,b) and flow 360 proceeds along the "registered user" or "guest user" branch as appropriate.

For the "registered user" branch, blocks 350a, 352a, and 354a are performed as discussed above with respect to FIG. 3C. This final check is performed to capture any requests made by registered users that, despite the negative scoring in accordance with the scoring model, should be permitted to be serviced without restriction.

For the "guest user" branch, blocks 324b, 326b, 328b, and 320b are performed as discussed above with respect to FIG. 3B. Even for guest users, and despite the negative scoring in accordance with the scoring model, received requests associated with a trusted domain name are serviced without restriction.

Aggregation of Counter Counts for Transfer

In an embodiment, another optimization of the request analysis/scoring technique comprises aggregation of parameter counts to reduce the number of count transfers to longer term storage. Rather than transferring counts associated with a request on a per request basis, the cache counter component 206 employs a transfer optimization technique to reduce the frequency of data transfers or "data dumps" to the database counters.

Figure 4A:
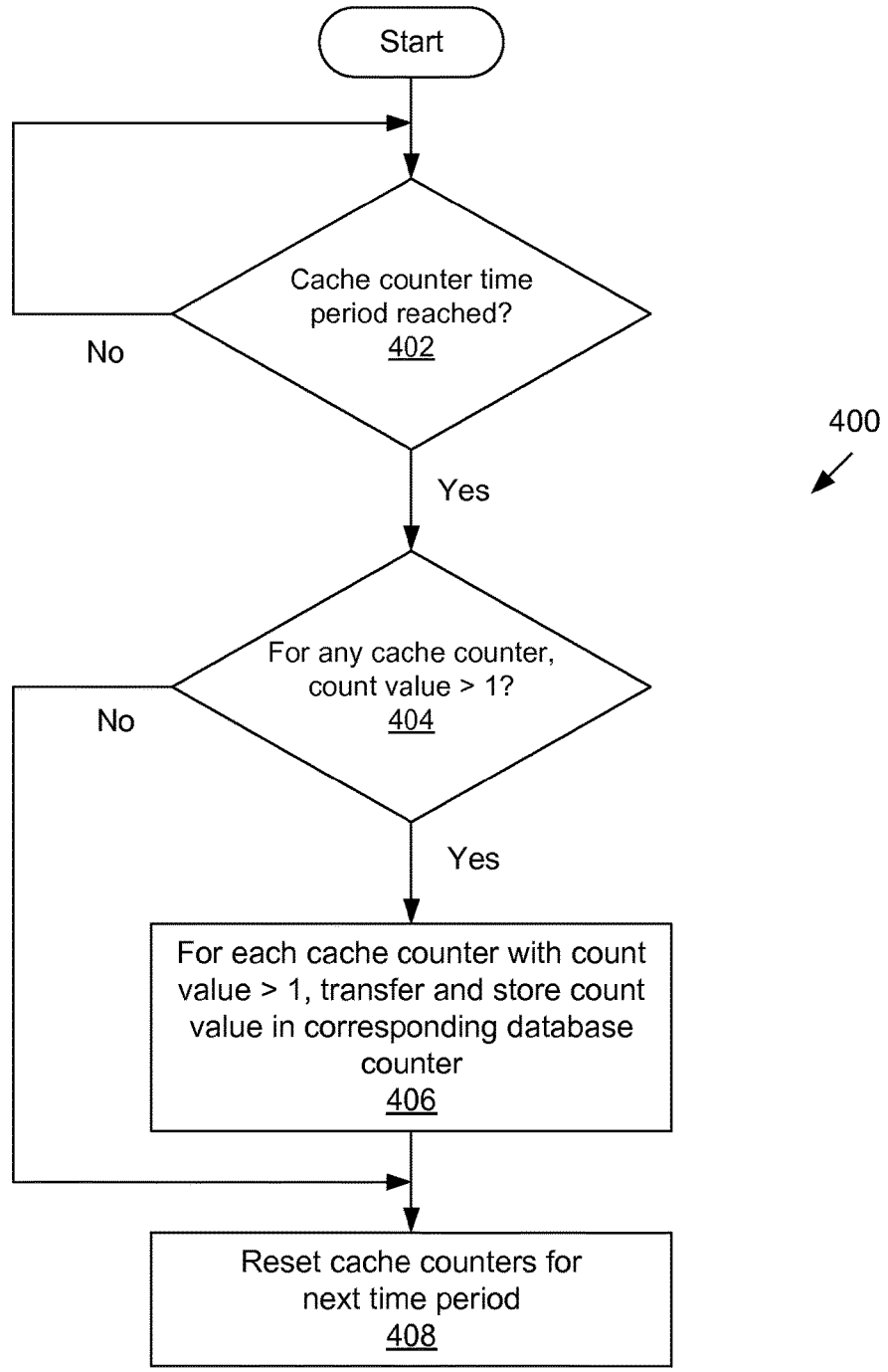
FIGS. 4A-4B depict example flows for a data transfer optimization technique, according to some embodiments.

FIG. 4A depicts an example flow 400 detailing the transfer optimization technique, according to an embodiment. Flow 400 and flows 300, 340, or 360 may occur in parallel or asynchronously with each other. Flow 400 is performed by each "local" server or machine of the online service.

In block 402, whether a (pre-set) time period associated with the cache counters has been reached is checked. Recall that for each received request, cache counters for parameter values associated with the received request are incremented to count the number of times particular parameter values appear or occur. In an embodiment, the cache counters are configured to store counts for a certain time period, such as one minute, and then transfer the counts to other memory for longer term storage. For example, the number of requests received by the online service and thus counted by the cache counters may be on the order of 40,000 to 50,000 requests per second. Cache counters may be included in the local cache 104, and comprise flash memory or other type of memory that has fast access time but which may be limited in memory size.

If the time period has not been reached (no branch of block 402), then cache counter component 206 continues to monitor for expiration of the time period. And in the meantime, counts continue to accumulate or aggregate in the cache counters for parameter values associated with respective requests. If the time period has been reached (yes branch of block 402), then the cache counter component 206 determines which of the cache counters from among the plurality of cache counters for all the parameter values have a count value greater than a certain threshold value, such as one (block 404). In an embodiment, if the count value of a particular cache counter is one, then the frequency of occurrence of the parameter value is too low to merit longer term storage. In alternative embodiments, a lower or higher threshold value may be used to select the cache counters. In still other embodiments, more than one threshold may be pre-set, a first threshold for cache counters associated with a first parameter, a second threshold for cache counters associated with a second parameter, and the like.

If there is no cache counter that meets the minimum count value (no branch of block 404), then flow 400 proceeds to block 408. Otherwise, there are one or more cache counters, each having a high enough count value (yes branch of block 404) to merit transfer to respective (five minute) database counters in block 406. As discussed above, the database counters may comprise database counters that maintain counts on a 5 minute rolling basis. For example, if a cache counter for the "123456789" member identifier value has a count of 100 and a cache counter for the "234567890" member identifier value has a count of 12, then the count of 100 associated with the cache counter for the "123456789" member identifier value is transferred to a five minute database counter for the "123456789" member identifier value and the count of 12 associated with the cache counter for the "234567890" member identifier value is transferred to a five minute database counter for the "234567890" member identifier value.

Note that because database counters contain counts for a longer time period than cache counters (e.g., 5 minutes for database counters vs. 1 minute for cache counters) and contain counts from cache counters for every "local" server or machine of the online service, database counters contain significantly bigger counts than cache counters. As an example, when 5 minutes database counters and 1 minute cache counters are used, the same set of cache counters for a given "local" server or machine alone contributes five rounds of counts to the database counters.

Due to the aggregation of cache counter counts occurring within a certain time period (e.g., one minute) before they are propagated to the database counters, which are the counters used to perform the initial/first level check or analysis, the counts of parameter values associated with the received requests that are actually used for analyzing the requests may be delayed or not current up to the time period associated with aggregation of the cache counters (e.g., up to one minute).

Once the count transfer or propagation is complete, the cache counter component 206 resets the cache counters for each of the parameter values to zero for the next (pre-set) time period in block 408. Then flow 400 returns to block 402 to initiate the next aggregated transfer cycle.

Figure 4B:
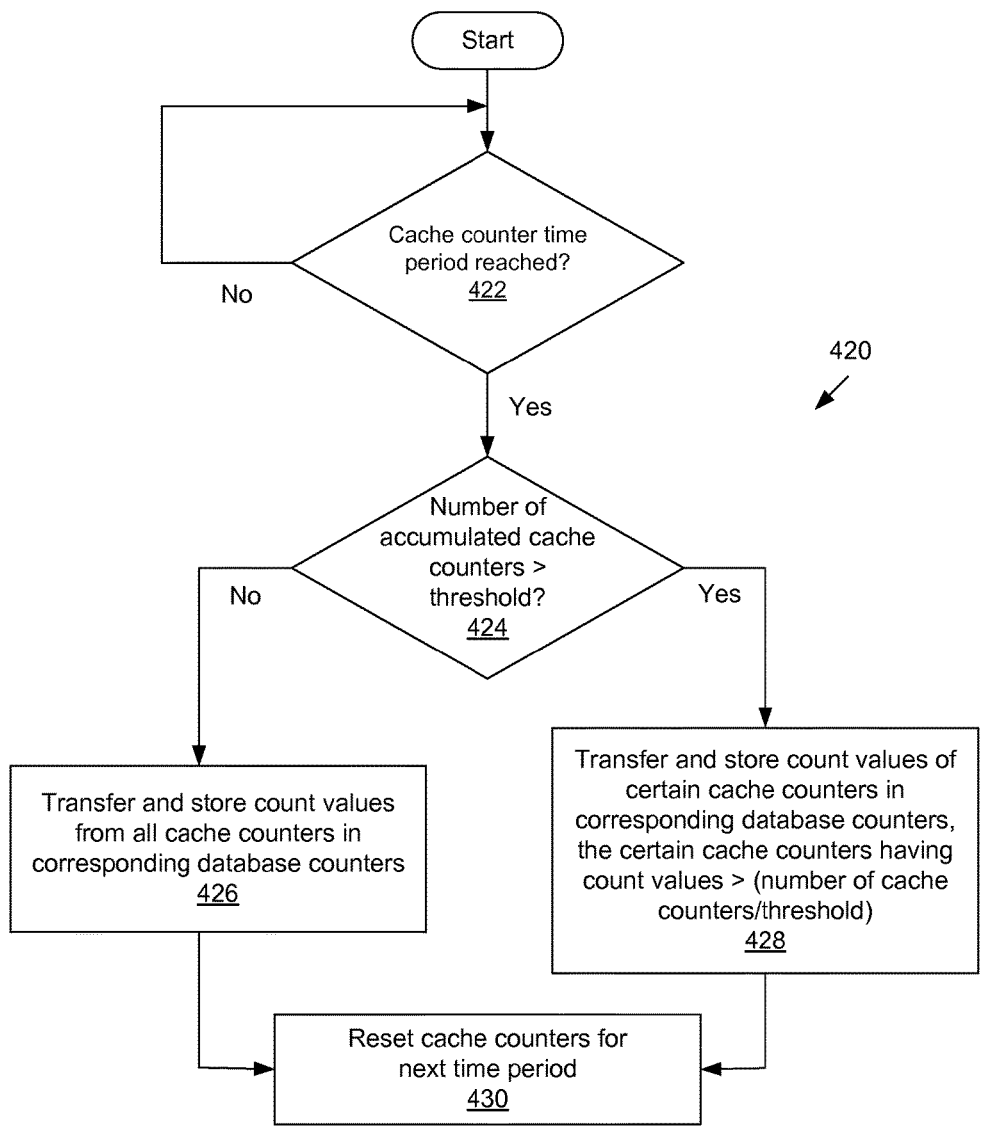

FIG. 4B depicts an example flow 420 detailing the transfer optimization technique, according to another embodiment. Flow 420 and flows 300, 340, or 360 may occur in parallel or asynchronously with each other. Flow 420 is performed by each "local" server or machine of the online service.

In block 422, whether a (pre-set) time period associated with the cache counters has been reached is checked. Recall that for each received request, cache counters for parameter values associated with the received request are incremented to count the number of times particular parameter values appear or occur. In an embodiment, the cache counters are configured to store counts for a certain time period, such as one minute, and then transfer the counts to other memory for longer term storage. For example, the number of requests received by the online service and thus counted by the cache counters may be on the order of 40,000 to 50,000 requests per second. Cache counters may be included in the local cache 104, and comprise flash memory or other type of memory that has fast access time but which may be limited in memory size.

If the time period has not been reached (no branch of block 422), then cache counter component 206 continues to monitor for expiration of the time period. And in the meantime, counts continue to accumulate or aggregate in the cache counters for parameter values associated with respective requests. If the time period has been reached (yes branch of block 422), then the cache counter component 206 determines whether the number of cache counters from among the plurality of cache counters for all the parameter values having accumulated counter values (e.g., those cache counters having a counter value greater than one) (also referred to as accumulated cache counters), exceeds a threshold in block 424.

If the number of accumulated cache counters does not exceed the threshold (no branch of block 424), then the count values from all the cache counters of the plurality of cache counters for the "local" server or machine are transferred and stored ("dumped") in respective database counters in block 426. If the number of accumulated cache counters exceeds the threshold (yes branch of block 424), then the count values from certain cache counters from among the plurality of cache counters for the "local" server or machine are transferred and stored in respective database counters in block 428. Namely, the certain cache counters are those cache counters having count values greater than a number of cache counters divided by a threshold. The threshold may be the same or different from the threshold mentioned in block 424.

When there are a lot of accumulated cache counters (e.g., yes branch of block 424), then cache counters with low count values may not be significant enough (relative to other cache counters or across all the cache counters) to transfer and store in the database counters.

From blocks 426 and 428, flow 420 proceeds to block 430. Once the count transfer or propagation is complete, the cache counter component 206 resets the cache counters for each of the parameter values for the next (pre-set) time period in block 430. Then flow 420 returns to block 422 to initiate the next aggregated transfer cycle.

As discussed above for flow 400, because database counters contain counts for a longer time period than cache counters (e.g., 5 minutes for database counters vs. 1 minute for cache counters) and contain counts from cache counters for every "local" server or machine of the online service, database counters contain significantly bigger counts than cache counters. As an example, when 5 minutes database counters and 1 minute cache counters are used, the same set of cache counters for a given "local" server or machine alone contributes five rounds of counts to the database counters.

Due to the aggregation of cache counter counts occurring within a certain time period (e.g., one minute) before they are propagated to the database counters, which are the counters used to perform the initial/first level check or analysis, the counts of parameter values associated with the received requests that are actually used for analyzing the requests may be delayed or not current up to the time period associated with aggregation of the cache counters (e.g., up to one minute).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
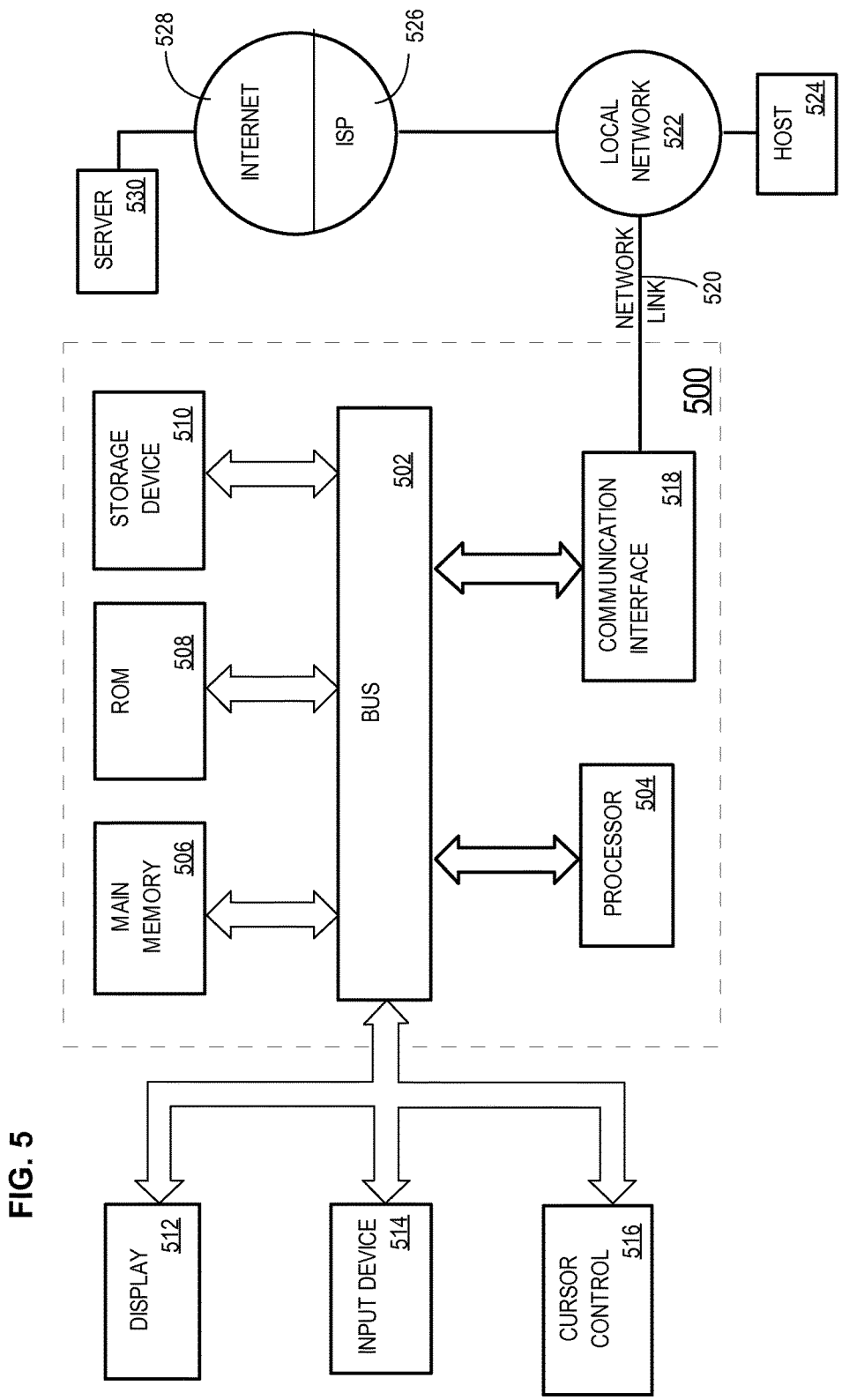
FIG. 5 illustrates a block diagram of an example computer system upon which embodiments of the present disclosure may be implemented.

For example, FIG. 5 is a block diagram that illustrates a computer system 500 upon which embodiments of the present disclosure may be implemented. Computer system 500 may be the server 102, database 106, clients 110, 114, 118, and/or 122. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT) or liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computerized method, comprising:
    performing a first-level check, comprising:
        identifying a plurality of values of a request to an online service, the plurality of values corresponding to a plurality of parameters associated with the request, wherein the plurality of parameters includes one or more of: an Internet Protocol (IP) address, a member identifier, an autonomous system number (ASN), a browser identifier, or a user agent;
        for each value of the plurality of values of the request, incrementing a counter, of a plurality of counters, that is associated with said each value, wherein the plurality of counters track values of multiple requests to the online service; and
        determining whether at least one counter, of the plurality of counters, associated with at least one value of the plurality of values of the request is greater than a threshold that corresponds to the at least one counter,
        wherein at least one counter being greater than the threshold leads to a failure of the first-level check; and
    in response to a failure of the first-level check, performing a second-level check, comprising:
        identifying a plurality of attributes associated with the request, including statistics associated with the parameters of the received request;
        determining whether an entity who initiated the request is uniquely identifiable or not uniquely identifiable;
        determining, based on the plurality of attributes, a restriction to associate with the entity, wherein the restriction is a first restriction when the entity is uniquely identifiable and a second restriction when the entity is not uniquely identifiable; and
        enabling the restriction,
    wherein the method is performed by one or more computing devices.

2. The method of claim 1, wherein the plurality of parameters includes the member identifier and the browser identifier, wherein the member identifier comprises a unique identifier of an account in the online service that is an online social network and the browser identifier comprises a cookie.

3. The method of claim 1, wherein determining whether to enable the restriction comprises analyzing a plurality of attributes including one or more of: an age of an account at the online service that is associated with the entity, a number of connections associated with the account, an identifier of a page of the online service requested in the request, whether the account is a premium account or a free account, statistics of an Internet Protocol (IP) address associated with the request, statistics of a browser identifier associated with the request, statistics of a user agent associated with the request, history of previous restrictions associated with the entity from previous requests, information associated with the account, entity activity on the online service, information associated with one or more of the plurality of values of the request, or information associated with previous requests associated with the entity.

4. The method of claim 1, wherein the entity is a member user that is uniquely identifiable or a guest user that is not uniquely identifiable.

5. The method of claim 4, wherein determining whether to enable the restriction comprises determining a first restriction when the entity is the member user and determining a second restriction when the entity is the guest user, wherein the first restriction is different from the second restriction.

6. The method of claim 1, wherein the entity is uniquely identifiable, and wherein determining whether to enable the restriction comprises selecting a particular restriction from among a plurality of restrictions that includes one or more of: a login restriction, a logout restriction for a current session, a logout restriction for all sessions, a challenge-on login restriction, or a warning notification.

7. The method of claim 1, wherein the entity is uniquely identifiable, and further comprising applying the restriction to a subsequent request to the online service that is initiated by the entity.

8. The method of claim 1, wherein the entity is not uniquely identifiable, and wherein determining whether to enable the restriction comprises selecting a particular restriction from among a plurality of restrictions that includes one or more of: a no restriction to provide information requested in the request, a reject restriction to not provide the information requested in the request and instead provide an error message, or a redirect restriction to not provide the information requested in the request and instead request additional information from the entity that initiated the request.

9. The method of claim 1, wherein the entity is not uniquely identifiable, and further comprising providing, to the entity that initiated the request, a response to the request in accordance with the restriction.

10. The method of claim 1,
wherein incrementing the counter, of the plurality of counters, that is associated with said each value comprises incrementing a first counter, of a plurality of first counters, that is associated with said each value,
wherein determining whether the at least one counter, of the plurality of counters, associated with the at least one value of the plurality of values of the request is greater than the threshold comprises determining whether at least a second counter, of a plurality of second counters, associated with the at least one value of the plurality of values of the request is greater than the threshold, and
wherein the plurality of first counters is a different set of counters than the plurality of second counters.

11. The method of claim 1, wherein determining whether the at least one counter, of the plurality counters, associated with the at least one value of the plurality of values of the request is greater than the threshold comprises, for each value of the plurality of values of the request:
determining whether a first counter exceeds a first threshold, wherein the first counter, of the plurality of counters, is associated with said each value for all of the multiple requests to the online service within a certain time period;
determining whether a second counter exceeds a second threshold, wherein the second counter, of the plurality of counters, is associated with said each value for a subset of the multiple requests to the online service within the certain time period, the subset of the multiple requests comprising requests of a particular type;
determining whether a count in the second counter divided by a count in the first counter exceeds a third threshold.

12. The method of claim 11, wherein, for said each value, the first threshold, the second threshold, and the third threshold are different from each other.

13. The method of claim 11, wherein, the first threshold, the second threshold, or the third threshold for the first value of the plurality of values of the request is the same or different than the first threshold, the second threshold, or the third threshold, respectively, for the second value of the plurality of values of the request.

14. The method of claim 1, further comprising determining whether to change the restriction based on an Internet Protocol (IP) address value from among the plurality of values of the request and a pre-approved list of IP addresses, or an electronic mail (email) address associated with the entity and a list of email addresses.

15. The method of claim 1, further comprising:
receiving a second request to the online service;
identifying a second plurality of values associated with the second request;
for each value of the second plurality of values, incrementing a second counter, of the plurality of counters, that is associated with said each value of the second plurality of values, wherein a count in each of the plurality of counters indicates a number of times that said each value has been detected in a particular period of time;
after lapse of the particular period of time, for each count of the respective plurality of counters:
determining whether said each count exceeds a particular threshold;
when said each count exceeds the particular threshold, propagating said each count to a corresponding counter of another plurality of counters.

16. The method of claim 15, wherein the particular threshold is one.

17. A system, comprising:
one or more processors;
one or more computer-readable media carrying instructions which, when executed by the one or more processors, cause:
performing a first-level check, comprising:
identifying a plurality of values of a request to an online service, the plurality of values corresponding to a plurality of parameters associated with the request,
wherein the plurality of parameters includes one or more of: an Internet Protocol (IP) address, a member identifier, an autonomous system number (ASN), a browser identifier, or a user agent;
for each value of the plurality of values of the request, incrementing a counter, of a plurality of counters, that is associated with said each value, wherein the plurality of counters track values of multiple requests to the online service; and
determining whether at least one counter, of the plurality of counters, associated with at least one value of the plurality of values of the request is greater than a threshold that corresponds to the at least one counter,
wherein at least one counter being greater than the threshold leads to a failure of the first-level check; and
in response to a failure of the first-level check, performing a second-level check, comprising:
identifying a plurality of attributes associated with the request, including statistics associated with the parameters of the received request;
determining whether an entity who initiated the request is uniquely identifiable or not uniquely identifiable;

determining, based on the plurality of attributes, a restriction to associate with the entity, wherein the restriction is a first restriction when the entity is uniquely identifiable and a second restriction when the entity is not uniquely identifiable; and
enabling the restriction.

18. A non-transitory computer-readable medium having instructions embodied thereon, which when executed cause a server system to perform a method, the method comprising:
performing a first-level check, comprising:
identifying a plurality of values of a request to an online service, the plurality of values corresponding to a plurality of parameters associated with the request, wherein the plurality of parameters includes one or more of: an Internet Protocol (IP) address, a member identifier, an autonomous system number (ASN), a browser identifier, or a user agent;
for each value of the plurality of values of the request, incrementing a counter, of a plurality of counters, that is associated with said each value, wherein the plurality of counters track values of multiple requests to the online service; and
determining whether at least one counter, of the plurality of counters, associated with at least one value of the plurality of values of the request is greater than a threshold that corresponds to the at least one counter,
wherein at least one counter being greater than the threshold leads to a failure of the first-level check; and
in response to a failure of the first-level check, performing a second-level check, comprising:
identifying a plurality of attributes associated with the request, including statistics associated with the parameters of the received request;
determining whether an entity who initiated the request is uniquely identifiable or not uniquely identifiable;
determining, based on the plurality of attributes, a restriction to associate with the entity, wherein the restriction is a first restriction when the entity is uniquely identifiable and a second restriction when the entity is not uniquely identifiable; and
enabling the restriction.

* * * * *